United States Patent [19]

Desmons et al.

[11] Patent Number: 4,628,342

[45] Date of Patent: Dec. 9, 1986

[54] OPTICAL TEST PATTERN FOR CORRECTING CONVERGENCE DEFECTS OF A COLOR CAMERA

[75] Inventors: Gerard Desmons; Gilles Marchand, both of Paris, France

[73] Assignee: Thomson CSF, Paris, France

[21] Appl. No.: 493,272

[22] Filed: May 10, 1983

[30] Foreign Application Priority Data

May 14, 1982 [FR] France ................................ 82 08486

[51] Int. Cl.$^4$ ........................................... H04N 17/00
[52] U.S. Cl. ..................................... 358/10; 358/139; 358/93
[58] Field of Search .............................. 358/10, 51–83, 358/93, 139

[56] References Cited

U.S. PATENT DOCUMENTS 2,855,515 10/1958 Bernard ................................. 358/10

FOREIGN PATENT DOCUMENTS 2454238 11/1980 France .
WO79/00717 10/1979 PCT Int'l Appl. .

Primary Examiner—Michael A. Masinick
Attorney, Agent, or Firm—Cushman, Darby & Cushman

[57] ABSTRACT

An optical test pattern for correcting convergence defects of a color camera comprises LN pattern elements ($1_{ln}$) each disposed within one of the LN rectangles which result from a camera-screen lattice arrangement formed by L groups each consisting of M lines and by N columns, each pattern element being constituted by a vertical component and a diagonal component.

11 Claims, 1 Drawing Figure

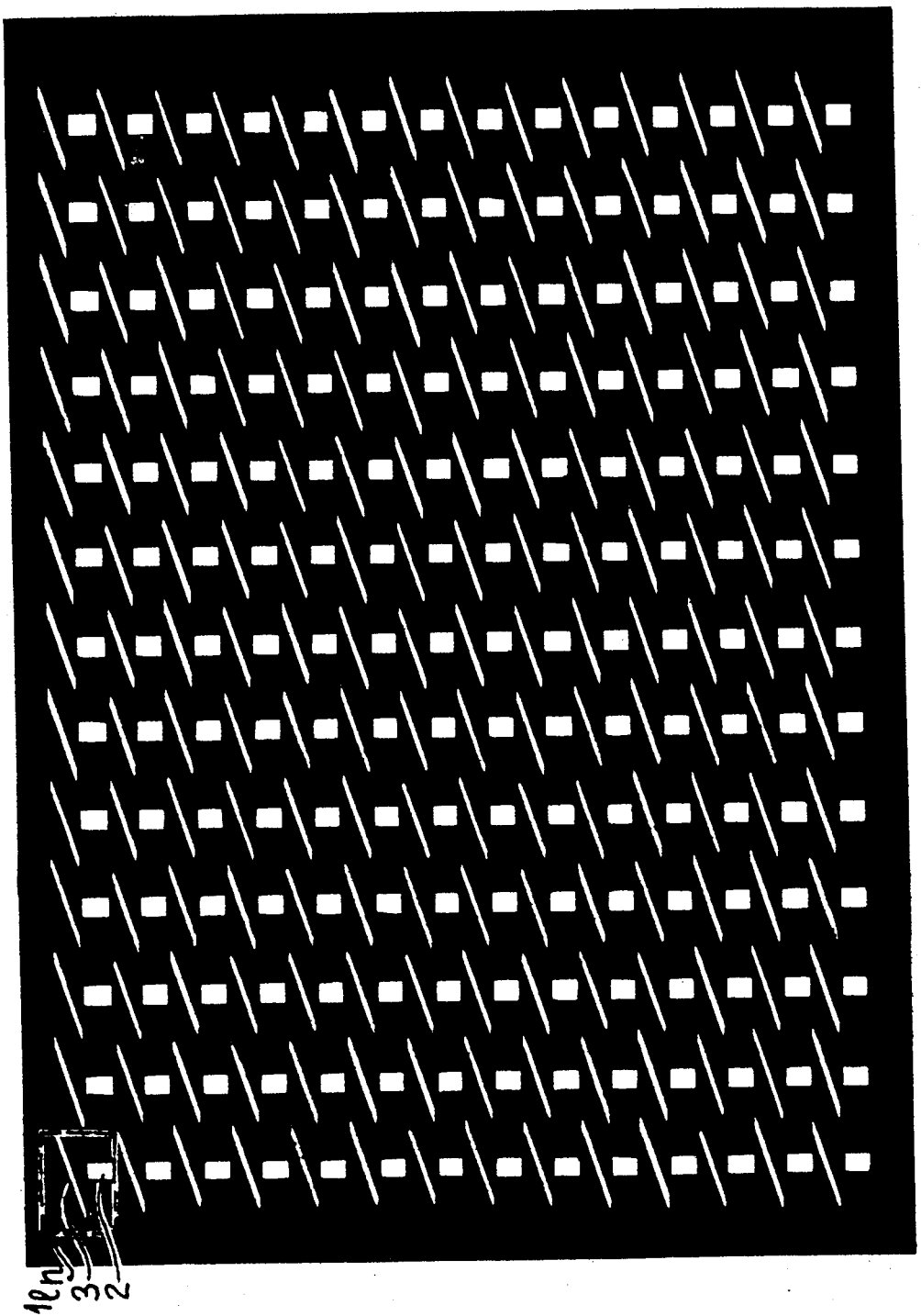

OPTICAL TEST PATTERN FOR CORRECTING CONVERGENCE DEFECTS OF A COLOR CAMERA

BACKGROUND OF THE INVENTION

This invention relates to an optical test pattern for correcting convergence defects of a color camera.

As a result of these convergence defects, the impact points of the electron beams corresponding to the three primary colors are imperfectly superimposed.

In French patent Application No 81 01287 filed on Jan. 23, 1981 in the name of the present Applicant, a device for automatic adjustment of convergence defects has been proposed. This device essentially comprises a correction memory for storing predetermined values of horizontal and vertical scanning correction signals associated with each of the LN rectangles which result from a camera-screen lattice arrangement formed by L groups each consisting of M lines and by N columns, and a sequencer for initiating the application of said correction signals to the camera-screen scanning means as said means pass through the corresponding rectangles of the screen.

SUMMARY OF THE INVENTION

This patent Application has for an object the provision of an optical test pattern for determining the value to be assigned to said horizontal and vertical scanning correction signals.

In accordance with the invention, said optical test pattern comprises LN pattern elements each disposed within one of the LN rectangles which result from a camera-screen lattice arrangement formed by L groups each consisting of M lines and by N columns, each pattern element being constituted by a vertical component and by a diagonal component.

BRIEF DESCRIPTION OF THE DRAWING

Other objects and features of the invention will be more apparent upon consideration of the following description and accompanying figure which illustrates an optical test pattern in accordance with the present invention.

DETAILED DESCRIPTION OF THE PREFERRED EMBODIMENT

By way of example, in the case of a 625-line picture, the surface of the screen is subdivided into a lattice formed by 13 columns (N=13) and by 14 groups of 20 lines each (L=14 and M=20). The optical test pattern accordingly consists of 13×14, that is to say 182 pattern elements $1_{1n}$ each disposed within one of the rectangles resulting from said lattice arrangement (where 1 varies from 1 to L and n varies from 1 to N).

Each pattern element $1_{1n}$ has a vertical component 2 and a diagonal component 3. These pattern components are preferably white on a black background.

The vertical pattern component 2 is constituted by a rectangle whose sides extend in the horizontal and vertical directions.

The diagonal pattern component 3 is constituted by a parallelogram, two sides of which are disposed in an oblique direction whilst the other two sides are disposed in the horizontal direction.

The oblique direction can have any desired angle of inclination.

By way of example corresponding to the illustration given in the accompanying figure, the diagonal pattern component is located above the vertical pattern component. These two components can nevertheless be positioned differently with respect to each other. For example, the diagonal component could be located beneath, to the right or left of the vertical component, and conversely.

Said pattern components have a predetermined height in the vertical direction by reason of the difficulty involved in bringing a scanning line into coincidence with a pattern component which is reduced to a line in the horizontal direction.

Said pattern components also have a predetermined width in the horizontal direction. In fact, as will become apparent hereinafter, this makes it possible to improve the convergence by determination of the convergence defects on the leading and trailing edges of the video signals.

Scanning takes place in line approximately at the center of each pattern component. In the case of each pattern element, the phase shift $\phi_1$ between the video signals obtained in respect of two out of the three primary colors (the third serves as a reference) is measured at the time of scanning of the diagonal transition and the phase shift $\phi_2$ between the same signals is measured at the time of scanning of the vertical transition.

The vertical pattern component is not affected by a convergence defect in the vertical plane. Said component is representative of a convergence defect in the horizontal plane $\Delta H$ which is deduced directly from a measurement of $\phi_2$.

The diagonal pattern component is affected by a horizontal and vertical convergence defect. The phase error $\phi_1$ measured at the time of scanning of said pattern component makes it possible to determine the vertical convergence error $\Delta V$ as soon as $\Delta H$ is known.

By means of line scanning of each pattern element, it is therefore possible to determine the horizontal and vertical convergence defects in each region of the screen corresponding to localization of the different pattern elements.

Computation is performed at each measurement point, for example by means of a computer located within the electronic portion of the camera.

The design of the test pattern under consideration can also be employed for determining defects of geometry by means of an electronic test pattern, in which case the phase shifts $\phi_1$ and $\phi_2$ are determined between the video signal corresponding to the reference color and the electronic test pattern.

As has been noted earlier, pattern components are of sufficient width to permit a measurement of phase shift on the leading and trailing edges of the video signals. It is in fact found in practice that there are differences in the rise time, in the passband and in the level of the video signals relating to the three colors. This is of no importance at the time of an adjustment of geometry with respect to the electronic test pattern, taking into account the degree of accuracy required. On the other hand, in the case of convergence defects, these effects may lead to visual defects even though a correct adjustment has been effected beforehand. It is for this reason that a phase-shift measurement is performed both on the trailing edges and on the leading edges, the mean value of these two measurements being then established. This makes it possible to symmetrize the residual convergence errors which arise from the difference in characteristics of the video signals considered.

What is claimed is:

1. An optical test pattern for correcting convergence defects of a color camera, said test pattern comprising an integer number LN of identical pattern elements ($1_{1n}$) each disposed within one of LN rectangles resulting from a camera-screen lattice arrangement formed by L groups each consisting of M lines and N columns, each said pattern element being constituted by one vertical pattern component and one diagonal pattern component.

2. A test pattern according to claim 1, wherein each vertical pattern component is a rectangle whose sides extend in horizontal and vertical directions.

3. A test pattern according to claim 1 wherein each diagonal pattern component is a parallelogram having two sides extending in the horizontal direction whilst the other two sides extend in an oblique direction.

4. A test pattern according to claim 1, wherein the vertical component and the diagonal component of each pattern element ($1_{1n}$) are disposed one above the other in the vertical direction.

5. A test pattern according to claim 1, wherein the vertical component and the diagonal component of each pattern element ($1_{1n}$) are disposed in adjacent relation in the horizontal direction.

6. A test pattern according to claim 2, wherein the vertical component and the diagonal component of each pattern element ($1_{1n}$) are disposed one above the other in the vertical direction.

7. A test pattern according to claim 3, wherein the vertical component and the diagonal component of each pattern element ($1_{1n}$) are disposed one above the other in the vertical direction.

8. A test pattern according to claim 2, wherein the vertical component and the diagonal component of each pattern element ($1_{1n}$) are disposed in adjacent relation in the horizontal direction.

9. A test pattern according to claim 3, wherein the vertical component and the diagonal component of each pattern element ($1_{1n}$) are disposed in adjacent relation in the horizontal direction.

10. A test pattern according to claim 1 wherein said vertical pattern component is a rectangle which has linear dimensions wherein the vertical height of the rectangle defines a larger distance than the horizontal width of the rectangle.

11. Apparatus as in claim 1 wherein said apparatus is used to determine convergence defect, using a method comprising the steps of:
measuring a convergence defect in a horizontal plane in said vertical pattern component;
measuring a diagonal convergence defect in said diagonal pattern component; and
determining a vertical convergence pattern defect from said horizontal and said diagonal convergence defects.

* * * * *